(No Model.)
S. D. STROHM.
UNDERGROUND ELECTRICAL CONDUIT.
No. 266,916. Patented Oct. 31, 1882.
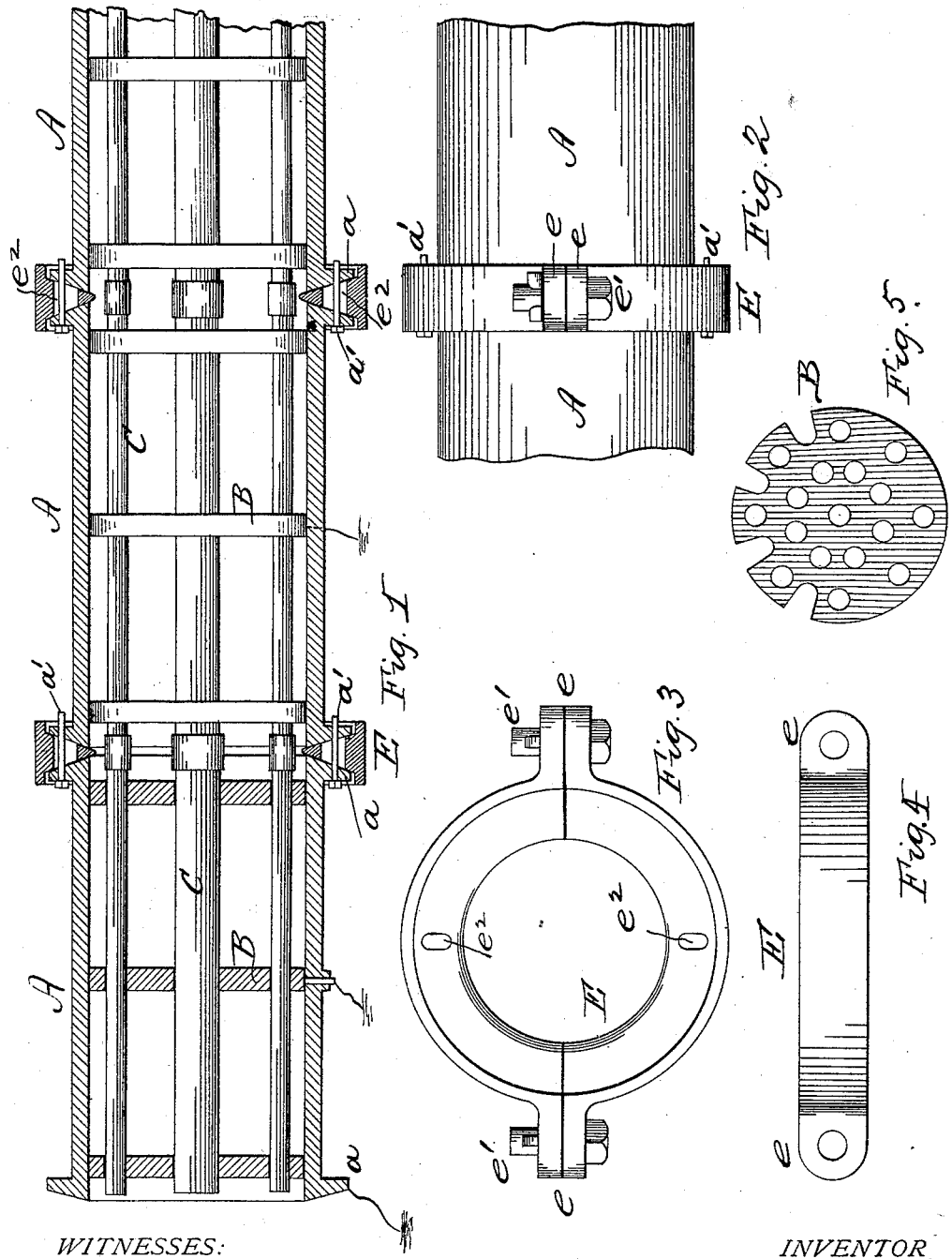
WITNESSES:
S. J. Van Stavoren
S. L. Jones
INVENTOR
Samuel D. Strohm,
By Connolly Bros,
ATTORNEYS

UNITED STATES PATENT OFFICE.

SAMUEL D. STROHM, OF PHILADELPHIA, PENNSYLVANIA.

UNDERGROUND ELECTRICAL CONDUIT.

SPECIFICATION forming part of Letters Patent No. 266,916, dated October 31, 1882.

Application filed February 13, 1882. (No model.)

*To all whom it may concern:*

Be it known that I, SAMUEL D. STROHM, a citizen of the United States, residing at Philadelphia, in the county of Philadelphia and State of Pennsylvania, have invented certain new and useful Improvements in Underground Electrical Conduits; and I do hereby declare the following to be a full, clear, and exact description of the invention, reference being had to the accompanying drawings, which form part of this specification, in which—

Figure 1 is a longitudinal vertical section of my invention. Fig. 2 is a broken side elevation of same. Fig. 3 is an end view of coupling device. Fig. 4 is a plan of same, and Fig. 5 is an elevation of diaphragm.

My invention has for its object to provide an electric conduit so constructed that it will of itself afford means for grounding the internal pipes or tubes containing the conductors without the employment of special grounding-wires for that purpose.

A further object of my invention is to provide means for making tight joints between the ends of sections forming the conduit-casing, such joints also being adapted to be removed, so as to facilitate the lifting of said sections when desired.

My invention consists, first, in making an electric conduit, comprising an external casing, internal conductor-pipes, and supporting-diaphragms, of conducting material, so that any electric currents induced in the said pipes will be conducted by means of the diaphragms or supports and casing directly to the ground; and, secondly, in forming the ends of the conduit-sections with flaring flanges, and in combining therewith beveled joint-rings fitted between the ends of the conduit-sections, as hereinafter more fully set forth.

Referring to the accompanying drawings, A A indicate the sections composing the external or main casing of an electric conduit. These sections may be each made in one piece; or they may be longitudinally divided to form two or more parts, and they may be circular in cross-section or of any other suitable or desired shape. Both ends of each section are formed with flanges *a a*, whose exterior faces are beveled or inclined, as shown.

B B represent diaphragms or supports for internal pipes or tubes, C C, which latter are adapted and designed to contain conducting wires or cables. The diaphragms may be of any suitable shape, and provided or combined with any proper means for holding them upright in the casing. They should also have orifices, peripheral notches, or other equivalent means for affording bearings for the pipes C C, which they support. Said pipes or tubes may be composed of sections, like the external casing, of any suitable shape, and, if desired, longitudinally divided into two or more parts; or they may consist merely of half-round pipes or gutters. The external casing, diaphragms, and internal pipes or conduits are all composed of conducting material, preferably iron. When laid under ground the whole system, comprising the parts specified—casing, diaphragms, and conduits—are grounded. The casing is of course in direct ground contact, and as it and the diaphragms and conduits are of conducting material the diaphragms and internal conduits are thus grounded, too. Hence any currents induced in said internal conduits are carried directly to ground without the employment of grounding-wires for that purpose.

E E represent joint-rings designed to fit between the ends of the sections A A. These rings are composed of metal or other equivalent hard and rigid material, and may be each in one piece or in two or more pieces, preferably two, as shown, each piece having two end lugs, *e e*, for the reception of bolts or screws *e' e'*, whereby they may be drawn toward each other and fastened together. These rings are beveled or made wedge-shaped in cross-section, so as to conform to the inclined faces of the casing-flanges *a a*. The rings are placed between the ends of the casing-sections, and when drawn together or contracted in diameter by screwing the bolts or nuts *e' e'* are forced inwardly, making a very tight joint between such sections. Bolts or screws *a' a'* connect the flanges *a a*, the rings E E having slots *e²* for the passage of such bolts.

When it is desired to remove a section wholly or in part the bolts *a'* are taken out, the bolts *e'* unscrewed, and the rings E E removed. This leaves play-space between the ends of the casing-sections, so that the latter can be lifted without interference with each other.

What I claim as my invention is—

1. An underground electric conductor-conduit comprising an external casing, internal pipes or conduits, and diaphragms or supports, said several parts being composed of metal or equivalent good conducting material, and in electrical contact for the purpose of grounding the internal conduits, as set forth.

2. The combination of casing-sections A A, having flaring or inclined end flanges, $a\ a$, beveled rigid joint-rings E E, with slots $e^2\ e^2$, and screws $a'\ a'$ and $e'\ e'$, substantially as shown and described.

In testimony that I claim the foregoing I have hereunto set my hand this 7th day of February, 1882.

SAMUEL D. STROHM.

Witnesses:
 ANDREW ZANE, Jr.,
 S. J. VAN STAVOREN.